May 19, 1959 S. G. HENDRIX ET AL 2,887,164
PROPELLER CONTROL SYSTEM
Filed Feb. 25, 1954 2 Sheets-Sheet 1

INVENTORS
SYLVAN G. HENDRIX
DALE W. MILLER
BY
*Craig V. Morton*
THEIR ATTORNEY

INVENTORS
SYLVAN G. HENDRIX
DALE W. MILLER
BY
Craig V. Morton
THEIR ATTORNEY

United States Patent Office 2,887,164
Patented May 19, 1959

2,887,164

PROPELLER CONTROL SYSTEM

Sylvan G. Hendrix, Troy, and Dale W. Miller, Brookville, Ohio, assignors to General Motors Corporation, Detroit, Mich., a corporation of Delaware Application February 25, 1954, Serial No. 412,595

3 Claims. (Cl. 170—160.21)

This invention pertains to fluid pressure systems, and particularly to a fluid pressure system for controlling variable pitch, constant speed propellers.

Heretofore, fluid pressure systems for controlling variable pitch, constant speed propellers have embodied governor controlled valves with flow characteristics that resulted in a rate of pitch adjustment substantially proportional to the speed error, or off-speed. That is, at small off-speeds, the pitch change rate is low, and as the off-speed increases, the pitch change rate increases proportionally. The pitch change rate is expressed in terms of blade angle change in degrees per second. The present invention relates to a servo system wherein the pitch change rate is proportional to the speed error, or off-speed, until the speed error reaches a predetermined magnitude, at which time, the pitch change rate is instantaneously increased to a fixed, predetermined high value. Once the propeller experiences an off-speed greater than the predetermined magnitude heretofore referred to, the pitch change rate is constant and, consequently, is no longer proportional to the off-speed. Accordingly, among our objects are the provision of a fluid pressure system including means for varying the actuation rate of a servo-motor to a maximum value in response to the condition of a device controlled by the servo-motor; the further provision of a servo system for variable pitch propellers, including means for supplementing the flow of a speed sensitive valve in response to relatively large speed variations from the speed setting thereof; and the still further provision of a fluid pressure system including governor controlled valves and servo actuated valve means for supplementing the flow of pressure fluid to propeller pitch adjusting means in response to large off-speeds so as to obtain a maximum rate of pitch change.

The aforementioned and other objects are accomplished in the present invention by providing a pair of servo actuated trigger valves and a control valve therefor, which is operable to actuate the trigger valves so as to increase the pitch change rate of the servo system to a maximum when the propeller off-speed exceeds a predetermined amount in either sense. Specifically, the servo system includes a source of fluid under regulated pressure, a fixed speed governor valve, a trigger control valve, a pair of trigger valves having parallel connection with the governor valve, and a servo-motor for adjusting propeller pitch. This basic servo system may be combined with other control devices, as depicted in the enclosed embodiment, but is capable of use by itself. Moreover, while the governor valve disclosed is of the speed sensitive type, it is readily apparent that a valve controlled by an independent governor could also be utilized.

The governor valve, as disclosed, may be mounted in a centrifugal field and calibrated so that during propeller rotation at a speed equal to the setting thereof, the valve assumes an equilibrium position wherein the pitch adjusting means are not actuated. When the rotative speed of the propeller departs from this predetermined speed in either sense, i.e. underspeed or overspeed, the governor valve responds due to variation in centrifugal force and directs pressure fluid to the pitch adjusting means so as to correct for the speed error and maintain the propeller speed substantially constant. When the speed error is relatively small, the governor valve flows at a pitch change rate proportional to off-speed, will result in maintaining substantially constant speed operation. However, when the speed error is relatively large, the pitch change rate of the governor valve alone is insufficient to correct the speed error with the desired rapidity. Accordingly, at these times the trigger control valve is operated to actuate either the increase pitch trigger valve or the decrease pitch trigger valve so as to supplement the governor valve flows, thereby increasing the pitch change rate of the servo system to a maximum. Thus, the propeller speed is returned to the preselected speed within a relatively short period of time, and, yet, the speed stability characteristics of the system are not adversely affected.

Further objects and advantages of the present invention will be apparent from the following description, reference being had to the accompanying drawings wherein a preferred embodiment of the present invention is clearly shown.

Figure 1:
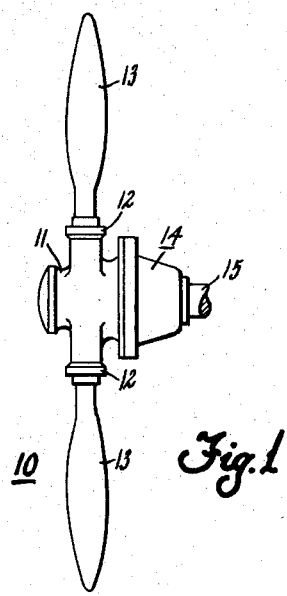
Fig. 1 is a fragmentary view, in elevation, of a variable pitch propeller incorporating the present invention.

With particular reference to Fig. 1, a variable pitch propeller 10 is shown including a hub 11 having a plurality of radially extending sockets 12 within which propeller blades 13 are supported for rotation about their longitudinal axes to different pitch positions. The hub 11 has attached thereto and rotatable therewith a regulator assembly 14, which regulator assembly contains a servo system for actuating pitch adjusting means which are carried by the hub 11. The propeller 10 is adapted to be rotated by an engine driven shaft 15. The pitch adjusting means and the regulator 14 may be of the type disclosed in the Blanchard et al. Patents 2,307,101 and 2,307,102.

Figure 3:
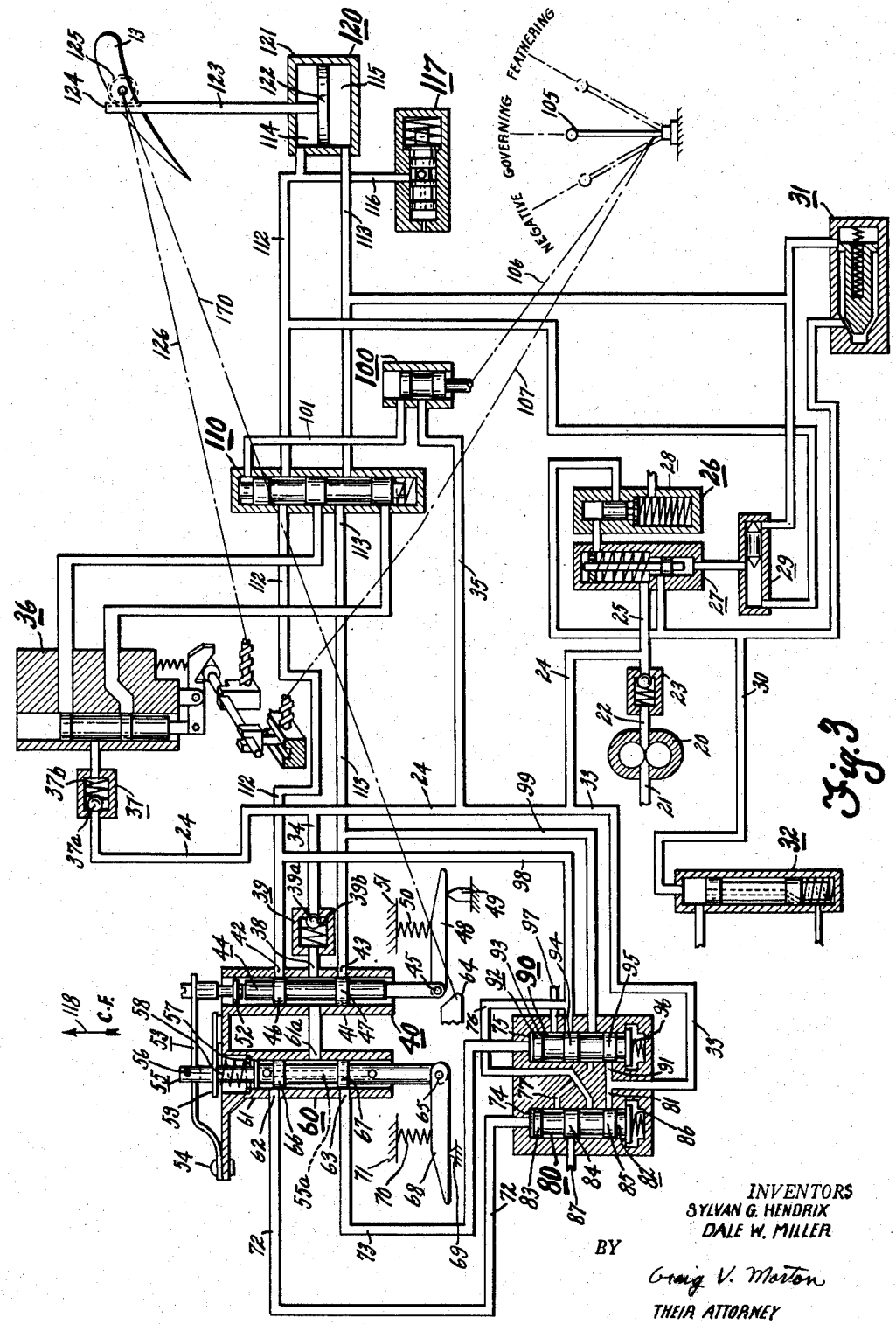
Fig. 3 is a schematic diagram of a typical variable pitch propeller servo system incorporating the present invention.

With reference to Fig. 3, a typical servo system for actuating the pitch adjusting means is depicted, it being understood that all components of the servo system exclusive of the pitch adjusting servo-motor or servo-motors, are mounted in the regulator 14. The servo system includes a pump 20, which is driven by the shaft 15. The pump 20 has an inlet 21, which is connected to the reservoir of fluid contained in the regulator 14. The pump 20 draws fluid from the reservoir through inlet 21 and discharges the same under pressure through outlet 22 and through a check valve 23 to a pressure conduit 24. The pressure conduit 24 includes a branch conduit 25 having connection with a pressure control valve assembly 26. The pressure control valve assembly 26 is generally of the type disclosed in copending application, Serial No. 276,372, filed March 13, 1952, now U.S. Patent No. 2,737,253, in the name of Richard E. Moore, et al., and includes an equal area valve 27, a pressure relief valve 28 and a shuttle valve 29. As the pressure control valve assembly forms no particular part of this invention, it will not be described in detail, and suffice it to say that the pressure control valve assembly 26 regulates the pressure in conduit 24, and maintains the pressure potential of fluid therein at a value sufficient to meet the demands of the pitch changing means, to be described. The pressure control valve assembly 26 diverts excess flow produced by the pump 20 into a conduit 30, which has connection with a decrease loader check valve 31 and a decrease loader release valve 32, of the type disclosed in the aforementioned copending application, Serial No. 276,372. As neither the decrease loader check valve nor the decrease loader release valve form any part of this invention, the operation and construction thereof will not be described herein.

The high pressure conduit 24 is connected with three branch conduits 33, 34 and 35. Conduit 24 communicates with the pressure supply port of a distributor valve 36 through a minimum pressure or relief valve 37. Conduit 34 communicates with the pressure supply ports 38 and 61a of a speed sensitive valve 40 and a trigger control valve 60, respectively, through a minimum pressure or relief valve 39. As depicted in Fig. 3, the minimum pressure valves 37 and 39 include ball type valve elements 37a and 39a and springs 37b and 39b. The minimum pressure valves 37 and 39 merely prevent the flow of pressure fluid to the supply ports of valves 36, 40 and 60 until the pressure potential of fluid in conduit 24 is of a value sufficient to meet the demands of the servo system. In other words, the minimum pressure valves 37 and 39 effectively prevent flow of fluid in the servo system from supply conduit 24 until the potential of pressure fluid therein is high enough to meet the requirements of the servo system.

Branch conduit 33 is connected to supply ports 81 and 91 of trigger valves 80 and 90, respectively, and branch conduit 35 is connected to the supply port of a selector control valve 100. The selector control valve 100 is, in turn, connected by a conduit 101 to a selector valve 110. As the distributor valve 36, the selector valve 110 and the selector control valve 100 form no part of this invention, construction and operation will not be described in detail. These valves are of the type disclosed in the aforementioned copending application, Serial No. 276,372, and are employed to control the pitch adjusting means, to be described, during propeller operation under conditions other than constant speed operation. Suffice it here to say that these valves are controlled by a pilot operated lever 105 through mechanical linkages 106 and 107, the selector valve 110 being servo actuated under the control of the selector control valve 100.

The speed sensitive valve 40 includes a valve guide 41, the ends of which are open and constitute drain ports, the valve guide 41 also having a pair of control ports 42 and 43 of rectangular shape. Control port 42 is connected to a conduit 112, which has connection through the selector valve 110 with an increase pitch chamber 114 of a servo-motor 120. The port 43 has connection with a conduit 113, which, likewise, communicates through the selector valve 110 with the decrease pitch chamber 115 of the servo-motor 120. The servo-motor 120 constitutes the pitch adjusting means of the propeller disclosed in Fig. 1 and includes a cylinder 121 having disposed therein a reciprocable piston 122 capable of fluid pressure actuation in both directions. As shown schematically in Fig. 3, the piston 122 includes a rod portion 123 having formed thereon a rack 124, which meshes with a pinion gear 125 attached to the propeller blade 13, such that reciprocation of the piston 122 will effect rotation of the blade 13 about its longitudinal axis. The propeller blade 13 is also shown as having connection with the linkage of the distributor valve 36 by means of a feed-back linkage 126, this linkage forming no part of the present invention. The increase pitch conduit 112 is also shown having a branch 116, which communicates with a constant leak valve assembly 117 of the type disclosed in copending application, Serial No. 273,860, filed February 28, 1952, in the name of Richard E. Moore, et al., now U.S. Patent No. 2,745,500. The constant leak valve assembly 117, likewise, forms no part of this invention, and, hence, will not be described.

The speed sensitive valve 40 includes a centrifugally responsive plunger 44 having a pair of spaced lands 46 and 47, which cooperate with rectangular ports 42 and 43, respectively. The plunger 44 responds directly to the thrust of centrifugal force in the direction of arrow 118 by reason of its being mounted radially within the regulator 14. The plunger 44 is pivotally connected at 45 to a lever 48 having a fixed fulcrum point 49. The lever 48 is urged in a counterclockwise direction about fulcrum point 49 by a compression spring 50, one end of which rests on the lever 48 and the other end of which engages fixed supporting structure 51. The valve 40 is termed speed sensitive in that the plunger 44 responds directly to the thrust of centrifugal force in the direction of arrow 118, which thrust tends to move the plunger 44 upwardly, as viewed in Fig. 3, in opposition to the thrust of force of spring 50. The speed setting of the valve 40 is fixed inasmuch as the mechanical advantage of lever 48 cannot be varied. When the thrust of centrifugal force is of a magnitude equivalent to that of spring 50 acting on the lever 48, the plunger 44 will assume an equilibrium position, as shown in Fig. 3, wherein lands 46 and 47 close ports 42 and 43. However, it is to be understood that a valve controlled by an external governor, not shown, could be substituted for the speed sensitive valve 40 without departing from the spirit and intent of the present invention.

As depicted in Fig. 3, the plunger 44 has associated therewith a cam 64, which is positioned by the blade 13 through a linkage 170. The cam 64 is moved to the right, as viewed in Fig. 3, when the blade 13 is at a predetermined low angle position, below which it is considered unsafe when the aircraft is air-borne. Accordingly, if the governor valve 40 is still directing pressure fluid to the decrease pitch chamber 115, the cam 64 will be positioned by the linkage 170 to move the plunger 44 upwardly so as to connect port 42 to pressure to hold blade angle and supply constant leak valve 117, thereby effecting a low pitch stop for the blade 13.

The valve guide 41 also has disposed therein a member 52, the member being loosely received within the valve guide. The member 52 is connected to a centrifugally responsive lever 53, the other end of which is pivotally supported at 54. Normally, the lever 53 responds directly to the thrust of centrifugal force and moves the member 52 so that the member 52 does not interfere with movements of the plunger 44. However, when the low pitch stop cam 64 is positioned by the linkage 170 so as to move the plunger 44 upwardly, the plunger 44 will engage the member 52 and impart counterclockwise movement to the lever 53, as viewed in Fig. 3. The purpose of this interaction between plunger 44 and lever 53 will be more particularly described hereinafter.

The intermediate portion of lever 53 passes through a bifurcated portion of a second speed sensitive plunger 55. The plunger 55 carries a cross pin 56, which contacts lever 53, and which is operable to impart upward movement of plunger 55, as viewed in Fig. 3, when the low pitch stop cam effects counterclockwise movement of the lever 53 through the plunger 44. Thus, when the low pitch stop position of the blade 13 is obtained, plunger 44 as well as plunger 55 will be moved upwardly, as viewed in Fig. 3, thereby interrupting the flow of pressure fluid to the decrease pitch chamber 115.

The plunger 55 is received in a valve guide 61 of the trigger control valve 60. The plunger 55 is, likewise, responsive to the thrust of centrifugal force in the direction of arrow 118 and is pivotally connected at 65 to a lever 68 having a fixed fulcrum point 69. The lever 68 is urged about the fulcrum point in a clockwise direction by spring 70, which is confined between the lever 68 and fixed supporting structure 71. Inasmuch as the plunger 55 is mounted radially within the regulator 14, it will be appreciated that centrifugal force tends to move the plunger upwardly, while the spring 70 tends to move the plunger downwardly, as viewed in Fig. 3.

Figure 2:
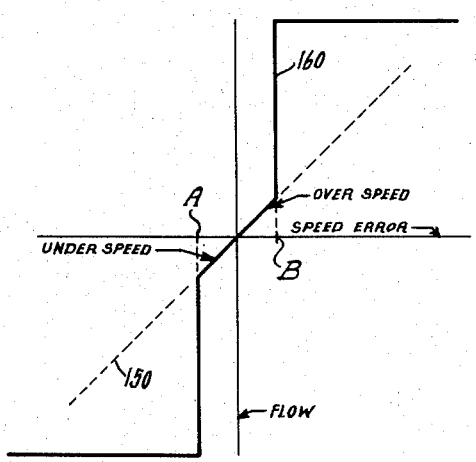
Fig. 2 is a graph depicting the combined flow rates of the servo system.

The valve guide 61 includes a supply port 61a and a pair of control ports 62 and 63. The plunger 55 is formed with a pair of spaced lands 66 and 67, which are spaced closer together than are the ports 62 and 63. In this manner, the ports 62 and 63 will be blocked from the port 61a within a certain range of off-speed, which is called a deadband range. The plunger 55 engages a washer 57, which is seated against an internal shoulder of the valve guide 61 by means of a spring 58. The spring 58 is retained by a member 59. The spacing of lands 66 and 67 is such that the plunger 55 will not respond to a minimum A to B speed error range, as depicted in Fig. 2. Point A may be varied by adjusting the force of spring 70, and point B may be varied by adjusting the force of spring 58. After the range A to B has been established, spring 50 may be adjusted so that the plunger 44 assumes an equilibrium position at the preselected speed level, which is midway between points A and B. The plunger 55 is also formed with a passage 55a, which opens to the valve guide 61 on opposite sides of the lands 66 and 67. As shown in Fig. 3, control port 62 is connected to conduit 72, while control port 63 is connected to a conduit 73. Conduit 72 connects with a servo chamber 74 for actuating increase pitch trigger valve 80, while conduit 73 communicates with a servo chamber 75 for actuating decrease trigger valve 90. Trigger valve 80 includes a plunger 82 having spaced lands 83, 84 and 85, the plunger 82 normally being urged upwardly by means of a spring 86. The plunger 82 is mounted in a guide having passages 76 and 77 and a drain port 87.

Trigger valve 90, likewise, includes a plunger 92 having spaced lands 93, 94 and 95. The plunger 92 is, likewise, urged upwardly by a spring 96, the plunger being mounted in a guide having communication with passages 76 and 77 having a drain port 97. The housing for the trigger valves 80 and 90 is formed with control ports, which communicate with conduits 98 and 99 having connection with conduits 112 and 113, respectively. Passage 76 is always in communication with conduit 98 through an internal annular groove around land 94, shown schematically in Fig. 3. When the plungers of both trigger valves 80 and 90 are in the position shown in Fig. 3, communication between the conduit 33 and either conduit 98 or 99 is blocked by the plungers 82 and 92, respectively. Likewise, the conduits 98 and 99 are blocked from drain ports 87 and 97.

With reference to Fig. 2, the flow characteristics of the speed sensitive value 40 are depicted. In the graph the ordinate represents flow in cubic inches per second, while the abscissa represents speed error of the propeller in revolutions per second. The flow rate of the speed sensitive valve 40 is indicated by the straight line 150 including dashed and solid portions. The straight line indicates that the flow rate varies proportionally, or in a linear relation to the speed error. Thus, if only a speed sensitive valve is employed in the servo system for controlling propeller pitch, the pitch change rate will be proportional to the speed error. However, by employing the trigger valve assembly of this invention, the flow rate can be made to vary in a non-linear relationship to the speed error, as is indicated by the solid line 160 in Fig. 2. Thus, as soon as the propeller speed either increases or decreases a predetermined number of revolutions per second from the selected speed setting, the trigger valves 80 and 90 will be actuated, thereby increasing the flow rate of the servo system to a maximum as determined by the available pump capacity, which then includes the speed sensitive valve 40 and either the trigger valve 80 or the trigger valve 90. Trigger valve 80 is actuated under overspeed conditions, while trigger valve 90 is actuated under underspeed conditions. By employing trigger valves to automatically vary the pitch change rate of the servo system, the ability of the servo system to maintain the speed substantially constant is greatly enhanced. That is, the trigger valves are only operative to assist the speed sensitive valve when the speed error is substantial, and the proportional rate of the speed sensitive valve, per se, is maintained to promote speed stability at the selected speed to be maintained.

*Operation*

The operation of the servo system is as follows. When the speed of propeller rotation departs from the preselected speed to be maintained, the governor controlled valve 40 responds immediately in an attempt to correct the speed error. If the speed increases, the plunger 44 moves upwardly, thereby applying pressure fluid to the increase pitch chamber 114 while connecting the decrease pitch chamber 115 to drain. Thus, the pitch of the blades 13 is increased, thereby tending to reduce the speed of propeller rotation by imposing a greater load on the engine, not shown. Similarly, if the propeller speed should fall below the selected speed, the spring 50 will overcome the thrust of centrifugal force and move the plunger 44 downwardly so as to apply pressure fluid to the decrease pitch chamber 115, while the increase pitch chamber 114 is connected to drain. If the speed error is within the range A to B, as shown in Fig. 2, the pitch change rate of the servo system will be proportional to the speed error. However, if the propeller should overspeed an amount greater than the amount B, the trigger valve 80 will be actuated as follows.

When the propeller overspeeds an amount greater than that designated by the point B in Fig. 2, the plunger 55 and lever 53 will move up sufficiently so that land 66 will open port 62 to the annular groove between lands 66 and 67. It should be noted that the lands 66 and 67 are spaced closer together than ports 62 and 63 so that for speed errors within the range denoted by letters A and B, in Fig. 2, the trigger control valve 60 will not respond. However, upon the occurrence of overspeed errors greater than that indicated by point B in Fig. 2, pressure fluid will be directed to servo chamber 74, thereby moving trigger valve plunger 82 downwardly so as to interconnect port 81 and passage 76, while connecting passage 77 with drain port 87. Thus, pressure fluid will be supplied directly from conduit 24 to conduit 112 and the increase pitch chamber 114, as well as through the speed sensitive valve 40, thereby increasing the pitch change rate of the servo system to a maximum. Accordingly, the pitch of blade 13 will be adjusted more rapidly in an increase pitch direction so as to correct for the off-speed. As soon as the speed error is reduced to the point B, the plunger 55 will have moved to a position wherein servo chamber 74 is connected to drain through passage 72, port 62, and passage 55a, thereby interrupting the application of pressure fluid to the conduit 112 from the passage 76.

Similarly, if the propeller should underspeed to a degree greater than the point A, the trigger control valve plunger 55 and lever 53 will move downwardly under the urge of spring 70 so as to interconnect ports 61a and 63, thereby directing pressure fluid to servo chamber 75. Accordingly, trigger valve plunger 92 will be moved downwardly so that supply port 91 will be connected to conduit 99, while conduit 98 is connected to drain. In this manner, the flow from the speed sensitive valve 40 is supplemented by the parallel flow of trigger valve 90 to the decrease pitch chamber 115 so as to increase the pitch change rate of the servo system in correcting for underspeed errors greater than that indicated by point A in Fig. 2.

From the foregoing, it is apparent that the present invention provides a servo system wherein the rate of pitch change is increased automatically when the speed error exceeds a predetermined amount. Moreover, the present invention insures speed stability by maintaining the pitch change rate proportional to speed error when the speed error is relatively small. Consequently, the servo system of this invention is operable to both maintain substantially constant speed operation of a propeller and rapidly correct for substantial speed errors if the necessity therefor should arise.

While the embodiment of the present invention as herein disclosed, constitutes a preferred form, it is to be understood that other forms might be adopted.

What is claimed is as follows:

1. A fluid pressure system for maintaining substantially constant speed operation of a variable pitch propeller by adjusting the pitch thereof, said propeller having a plurality of blades mounted for rotation about their longitudinal axes to different pitch positions, including in combination, a source of fluid pressure, a servo-motor operatively connected to the propeller blades for adjusting the pitch position thereof, a first centrifugal speed sensitive valve interconnecting the source of pressure fluid and the servo-motor for directing pressure fluid to the servo-motor to adjust propeller pitch whenever propeller speed departs from said constant speed, said first centrifugal speed sensitive valve being capable of applying pressure fluid to said servo-motor so that the rate of pitch change varies in a linear relationship to the amount of speed error from said constant speed, a second centrifugal speed sensitive valve responsive only to propeller speed errors in excess of a predetermined magnitude, and a pair of servo actuated valves connected in parallel with said first speed sensitive valve and directly coupled to said second speed sensitive valve, said servo actuated valves being movable only between fully open and fully closed positions and connected to the source of pressure fluid and operable to supplement the flow of pressure fluid to the servo-motor so that the rate of pitch change varies in a non-linear relationship to the amount of speed error when the speed error is above said predetermined magnitude.

2. The combination set forth in claim 1 wherein each servo actuated valve includes a valve guide, a plunger in said valve guide, and resilient means normally maintaining the plunger in a fully closed position.

3. A fluid pressure system for maintaining substantially constant speed operation of a variable pitch propeller by adjusting the pitch thereof, said propeller having a plurality of blades mounted for rotation about their longitudinal axes to different pitch positions, including in combination, a source of fluid pressure, a servo-motor operatively connected to the propeller blades for adjusting the pitch position thereof, a first speed sensitive valve interconnecting the source of pressure fluid and the servo-motor for directing pressure fluid to the servo-motor to adjust propeller pitch whenever propeller speed departs from said constant speed, said first speed sensitive valve being capable of applying pressure fluid to said servo-motor so that the rate of pitch change varies in a linear relationship to the amount of speed error from said constant speed, a second speed sensitive valve responsive only to propeller speed errors in excess of a predetermined magnitude, comprising a valve guide having a pair of spaced ports and a reciprocable plunger disposed in said valve guide and having a pair of spaced lands, the lands of said plunger being spaced a lesser distance apart than are the ports in said valve guide whereby said second speed sensitive valve will only be operative when the speed error is above said predetermined magnitude, and a pair of servo actuated valves connected in parallel with said first speed sensitive valve, each of said servo actuated valves having connection with one of said valve guide ports so as to be actuated thereby, said servo actuated valves being connected to the source of fluid pressure and operable to supplement the flow of pressure fluid to said servo-motor so that the rate of pitch change varies in non-linear relationship to the amount of speed error when the speed error is above said predetermined magnitude.

References Cited in the file of this patent

UNITED STATES PATENTS

| | | |
|---|---|---|
| 2,545,684 | Carson et al. | Mar. 20, 1951 |
| 2,669,312 | Dinsmore et al. | Feb. 16, 1954 |